United States Patent
Seok

(10) Patent No.: US 10,200,224 B2
(45) Date of Patent: Feb. 5, 2019

(54) METHOD AND APPARATUS FOR TRANSMITTING DATA IN NON-LICENSED BAND

(71) Applicant: LG ELECTRONICS INC., Seoul (KR)

(72) Inventor: Yongho Seok, Seoul (KR)

(73) Assignee: LG ELECTRONICS INC., Seoul (KR)

(*) Notice: Subject to any disclaimer, the term of this patent is extended or adjusted under 35 U.S.C. 154(b) by 264 days.

(21) Appl. No.: 15/102,520

(22) PCT Filed: Jun. 19, 2014

(86) PCT No.: PCT/KR2014/005402
§ 371 (c)(1),
(2) Date: Jun. 7, 2016

(87) PCT Pub. No.: WO2015/083914
PCT Pub. Date: Jun. 11, 2015

(65) Prior Publication Data
US 2018/0167821 A1  Jun. 14, 2018

Related U.S. Application Data

(60) Provisional application No. 61/913,355, filed on Dec. 8, 2013.

(51) Int. Cl.
*H04L 27/26* (2006.01)
*H04L 5/00* (2006.01)
(Continued)

(52) U.S. Cl.
CPC ........ *H04L 27/2602* (2013.01); *H04L 5/0053* (2013.01); *H04L 5/0094* (2013.01);
(Continued)

(58) Field of Classification Search
CPC ... H04W 16/14; H04W 72/042; H04W 84/12; H04L 27/2602; H04L 5/0094
See application file for complete search history.

(56) References Cited

U.S. PATENT DOCUMENTS 7,856,068 B1\* 12/2010 Tung ................... H04L 25/0232
370/334
2008/0107095 A1  5/2008 Black et al.
(Continued)

FOREIGN PATENT DOCUMENTS

| KR | 10-2010-0069063 A | 6/2010 |
| WO | 2013-006006 A2 | 1/2013 |
| WO | 2013-116998 A1 | 8/2013 |

OTHER PUBLICATIONS

PCT International Application No. PCT/KR2014/005402, International Search Report dated Sep. 25, 2014, 1 page.

*Primary Examiner* — Hashim S Bhatti
(74) *Attorney, Agent, or Firm* — Lee, Hong, Degerman, Kang & Waimey

(57) ABSTRACT

Disclosed is a method and apparatus for transmitting data in a non-licensed band. The method of transmitting downlink data in the non-licensed band may comprise the steps of: generating, by a base station, downlink data and transmitting the downlink data to a terminal through a downlink subframe. The downlink data may comprise wireless LAN preamble, PDCCH data, and PDSCH data. The wireless LAN preamble may comprise information on time resources for communication between the base station and the terminal, and the PDCCH data may comprise control data for the terminal. Also, the PDSCH data may comprise traffic data for the terminal.

10 Claims, 14 Drawing Sheets

(51) Int. Cl.
  *H04W 16/14*  (2009.01)
  *H04W 72/04*  (2009.01)
  *H04W 84/12*  (2009.01)

(52) U.S. Cl.
  CPC ......... *H04W 16/14* (2013.01); *H04W 72/042* (2013.01); *H04L 5/001* (2013.01); *H04W 84/12* (2013.01)

(56) References Cited

U.S. PATENT DOCUMENTS

| | | |
|---|---|---|
| 2012/0015607 A1 | 1/2012 | Koskela et al. |
| 2013/0170387 A1* | 7/2013 | Wang ...................... H04W 4/70 370/252 |
| 2013/0272262 A1* | 10/2013 | Li ......................... H04W 28/02 370/330 |
| 2013/0301608 A1* | 11/2013 | Frenne ................ H04W 74/004 370/331 |

* cited by examiner

FIG. 1
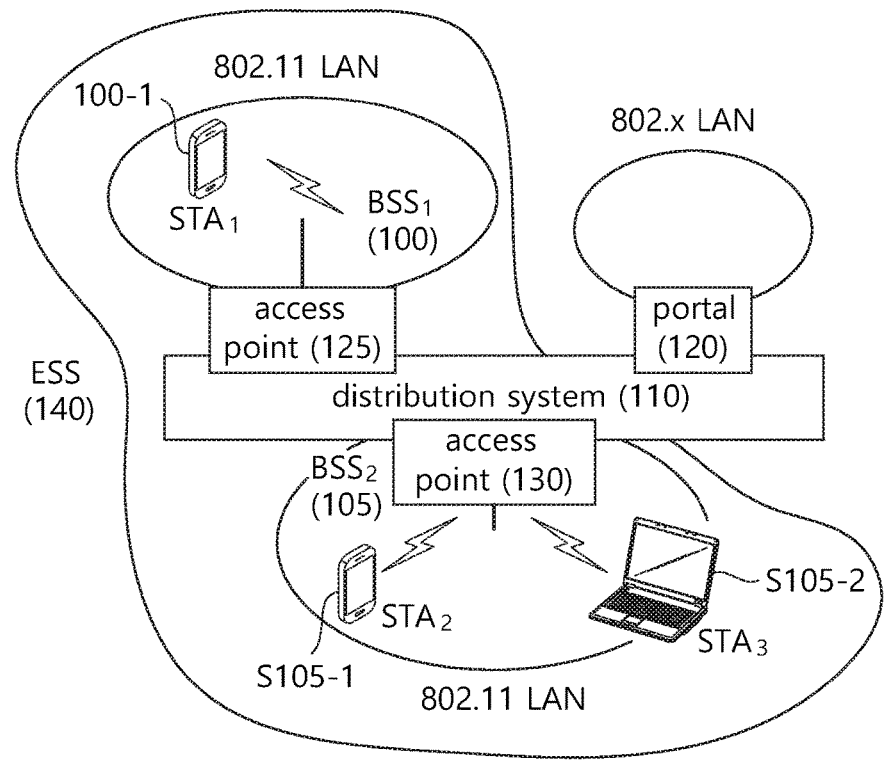
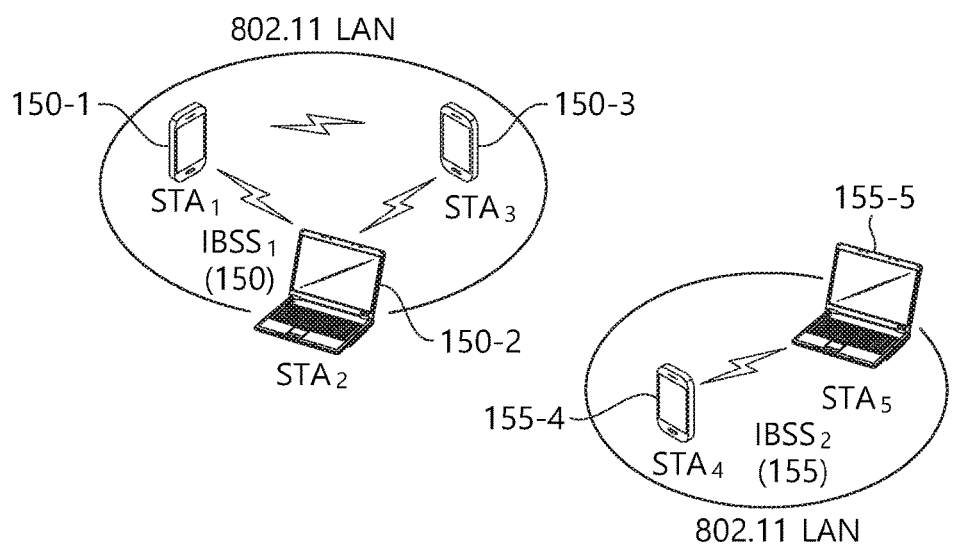

METHOD AND APPARATUS FOR TRANSMITTING DATA IN NON-LICENSED BAND

CROSS-REFERENCE TO RELATED APPLICATIONS

This application is the National Stage filing under 35 U.S.C. 371 of International Application No. PCT/KR2014/005402, filed on Jun. 19, 2014, which claims the benefit of U.S. Provisional Application No. 61/913,355, filed on Dec. 8, 2013, the contents of which are all hereby incorporated by reference herein in their entirety.

BACKGROUND OF THE INVENTION

Field of the Invention

The present invention relates to wireless communications, and more particularly, to a method and apparatus for transmitting data in an unlicensed band.

Related Art

A usage amount of mobile data has been explosively increased due to the introduction of a smart phone. The increase in the usage amount of the mobile data leads to an increase in a mid- and long-term frequency demand of communication operators despite of at least $4^{th}$ generation cutting-edge technology capable of effectively using a frequency resource. In addition thereto, a frequency demand scale is also in an increasing trend in a sector other than communication such as broadcasting, public, disaster services, or the like. In case of using an exclusive frequency distribution scheme based on a license type, it is difficult to flexibly cope with a demand-supply relation of various frequency resources as described above. Accordingly, there is a need for a long-term evolution (LTE) technique in an unlicensed band among open-type frequency utilization methods which can be regarded as a new paradigm of the frequency distribution scheme.

From a perspective of the communication operator, such an increase in a data traffic usage amount results in a decrease in a cycle of an investment in facilities for network capacity expansion as well as a persistent decrease in an average revenue per user (ARPU), and thus is pointed out as a cause of deteriorating business profitability. Therefore, it is absolutely required to find a method of remarkably extending data capacity that can be provided by a network without a large-scale investment in facilities or a wide-range increase in a communication fee while fully satisfying a customer demand for using data.

In this context, one of solutions introduced by a plurality of wireless communication operators to cope with data explosion is off-loading of wireless data traffic which is concentrated on an LTE network by utilizing a wireless local area network (WLAN) communication scheme that can be used in an unlicensed band such as an industrial, scientific and medical (ISM) band. According to a characteristic of the unlicensed band, the communication operator ensures an exclusive frequency usage right through a procedure such as an auction. Therefore, a WLAN network finely designed has an advantage in that capacity can be off-loaded with a significant level by using an incomparably lower price than network implementation in a licensed band. On the other hand, a great number of communication facilities can be used without restriction in compliance with only a rule related to inter-band protection and intra-band interference of at least a specific level. Accordingly, it is difficult to ensure communication quality of a level that can be provided by a communication service through a licensed band in which an exclusive right of use is ensured.

There is an ongoing standardization since 2002 for inter-working between an LTE service which is a $3^{rd}$ generation partnership project (3GPP) standard technique and a wireless local area network (WLAN) which is an IEEE standard technique. Disadvantageously, however, it is not easy to provide a service by perfectly integrating two networks having different network structures in terms of handover, quality of service (QoS) guarantee, or the like.

SUMMARY OF THE INVENTION

The present invention provides a method of transmitting data in an unlicensed band.

The present invention also provides an apparatus for transmitting data in an unlicensed band.

In order to accomplish the object of the present invention, according to an aspect of the present invention, a method of transmitting downlink data in an unlicensed band may include: generating, by a base station, downlink data; and transmitting, by the base station, the downlink data to a terminal through a downlink subframe. The downlink data may include a wireless local area network (WLAN) preamble, physical downlink control channel (PDCCH) data, and physical downlink shared channel (PDSCH) data. The WLAN preamble may include information on time resources for communication between the base station and the terminal. The PDCCH data may include control data for the terminal. The PDSCH data may include traffic data for the terminal.

In order to accomplish the object of the present invention, according to another aspect of the present invention, a base station for transmitting downlink data in an unlicensed band may include: a radio frequency (RF) unit for transmitting or receiving a radio signal; and a processor selectively coupled to the RF unit. The processor may be configured to: generate downlink data; and transmit the downlink data to a terminal through a downlink subframe.

The downlink data may include a WLAN preamble, PDCCH data, and PDSCH data. The WLAN preamble may include information on time resources for communication between the base station and the terminal. The PDCCH data may include control data for the terminal. The PDSCH data may include traffic data for the terminal.

When a long term evolution (LTE) system operates in an unlicensed band, the system may coexist with the legacy wireless local area network (WLAN) system. A field corresponding to a WLAN preamble can be transmitted on a downlink subframe and uplink subframe of the LTE system. By using this method, it is possible to avoid a collision between an e-Node B (eNB) and user equipment (UE) of an LTE system or LTE-A system operating in the unlicensed band and an access point (AP) and station (STA) of the WLAN system.

BRIEF DESCRIPTION OF THE DRAWINGS

FIG. 1 is a concept view illustrating the structure of a wireless local area network (WLAN).

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
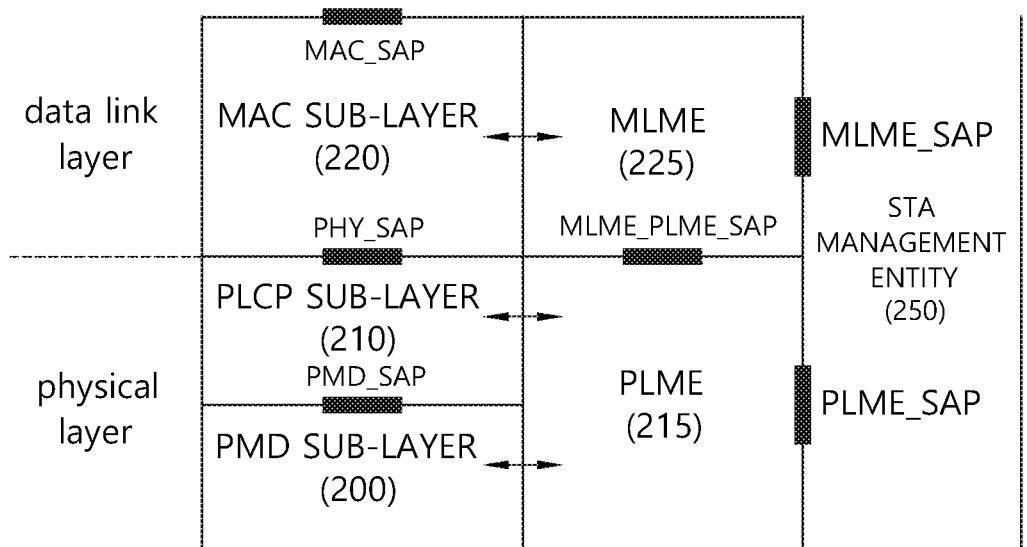
FIG. 2 is a view illustrating a layer architecture of a WLAN system supported by Institute of Electrical and Electronics Engineers (IEEE) 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
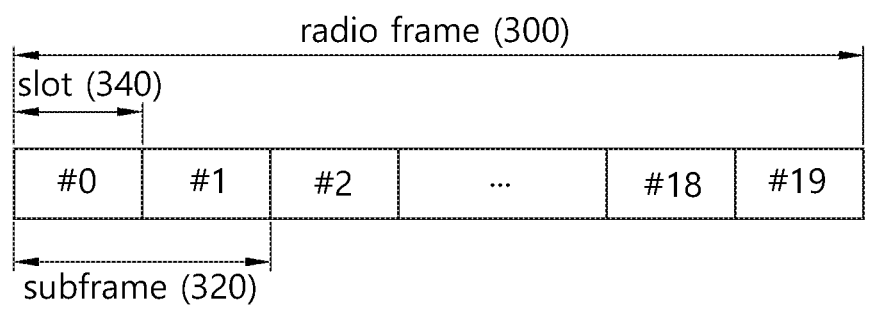
FIG. 3 illustrates a structure of a radio frame in 3$^{rd}$ generation partnership project (3GPP) long term evolution (LTE).

FIG. 3 illustrates a structure of a radio frame in $3^{rd}$ generation partnership project (3GPP) long term evolution (LTE).

In 3GPP LTE, a structure of a radio frame 300 may refer to the section 5 of 3GPP ($3^{rd}$ Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 3, one radio frame 300 consists of 10 subframes 320, and one subframe 320 consists of 2 slots 340. The radio frame 300 may be indexed according to the slot 340 in the range of a slot #0 to a slot #19, or may be indexed according to a subframe in the range of a subframe #0 to a subframe #9 in accordance with the subframe 320. The subframe #0 may include the slot #0 and the slot #1.

A radio frame 320 includes 10 subframes, and one subframe includes two slots. The time taken for one subframe to be transmitted is called a Transmission Time Interval (TTI). For example, the length of one subframe 320 may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot. The structure of the radio frame is only illustrative, and the number of subframes included in a radio frame or the number of slots included in a subframe and the number of OFDM symbols included in a slot may be changed in various ways.

In 3GPP LTE, it is defined such that one slot includes 7 OFDM symbols in a normal cyclic prefix (CP) and one slot includes 6 OFDM symbols in an extended CP.

A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band. A channel response based on the TDD scheme is reciprocal in practice. This implies that a downlink channel response is almost identical to an uplink channel response in a given frequency domain. Therefore, in a TDD-based wireless communication system, the downlink channel response can be advantageously obtained from the uplink channel response. In the TDD scheme, a full frequency band is time-divided into uplink transmission and downlink transmission, and thus downlink transmission performed by an eNB and uplink transmission performed by a UE can be simultaneously achieved. In a TDD system in which uplink transmission and downlink transmission are divided on a subframe basis, uplink transmission and downlink transmission are performed in different subframes.

Figure 4:
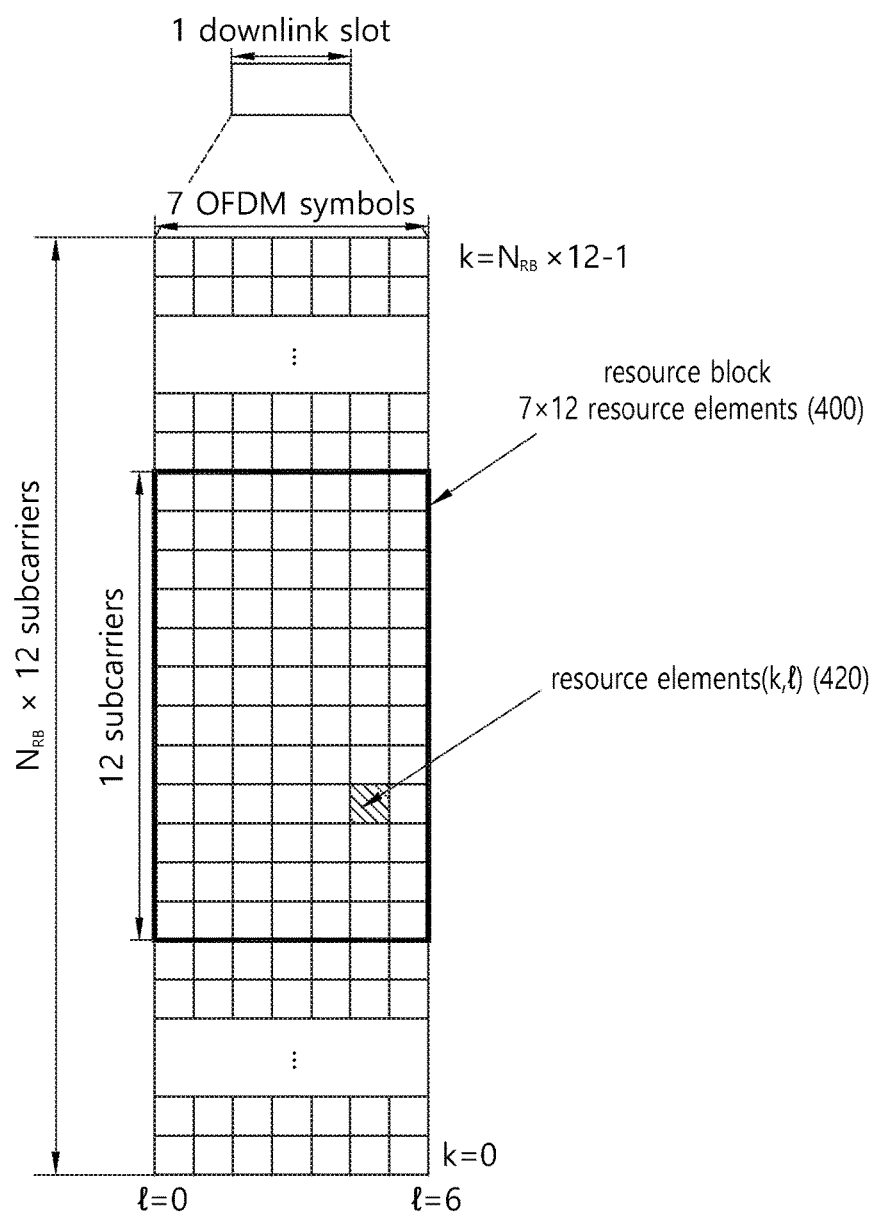
FIG. 4 is a concept view illustrating a resource grid for a downlink slot.

FIG. 4 is a concept view illustrating a resource grid for a downlink slot.

The downlink slot may include a plurality of OFDM symbols in a time domain, and includes $N_{RB}$ resource blocks in a frequency domain. The number $N_{RB}$ of resource blocks included in the downlink slot depends on a downlink transmission bandwidth determined in a cell. For example, in the LTE system, $N_{RB}$ may be any one value in the range of 60 to 110. One resource block 400 includes a plurality of subcarriers in a frequency domain. A structure of an uplink slot may be the same as the aforementioned structure of the downlink slot.

Each element on the resource grid is referred to as a resource element 420. The resource element 420 on the resource grid can be identified by an index pair (k,l) within the slot. Herein, k (k=0, . . . , $N_{RB}\times12-1$) denotes a subcarrier index in the frequency domain, and l (l=0, . . . , 6) denotes an OFDM symbol index in the time domain.

Although it is described herein that one resource block 400 consists of 7 OFDM symbols in the time domain and 12 subcarriers in the frequency domain and thus includes 7×12 resource elements 420, this is for exemplary purposes only. Therefore, the number of OFDM symbols and the number of subcarriers in the resource block 400 are not limited thereto. The number of OFDM symbols and the number of subcarriers may change variously depending on a CP length, a frequency spacing, etc. For example, the number of OFDM symbols is 7 in a normal CP case, and the number of OFDM symbols is 6 in an extended CP case. The number of subcarriers in one OFDM symbol may be selected from 128, 256, 512, 1024, 1536, and 2048.

Figure 5:
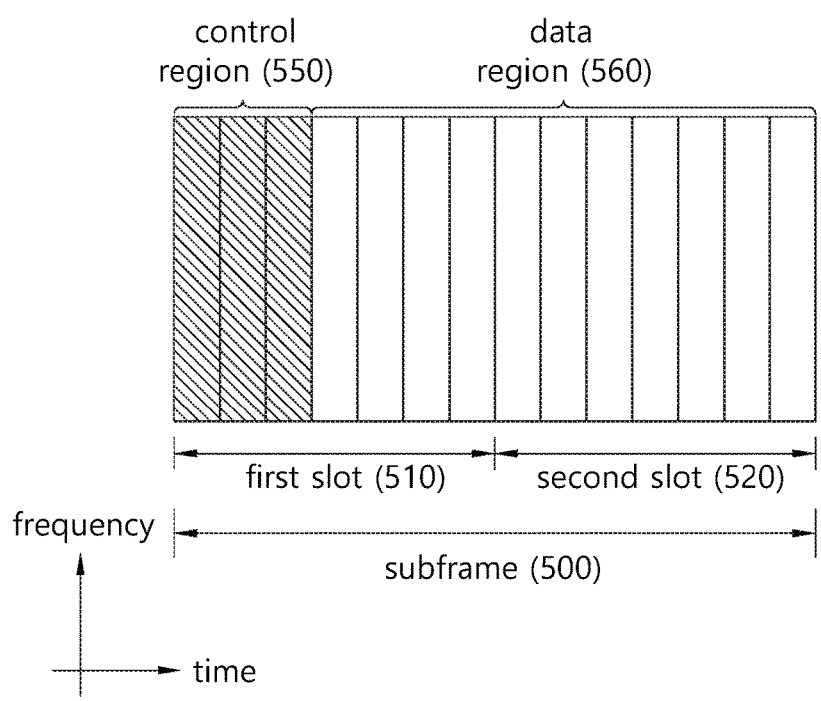
FIG. 5 illustrates a structure of a downlink subframe.

FIG. 5 illustrates a structure of a downlink subframe.

A downlink subframe 500 includes two slots 510 and 520 in a time domain. Each of the slots 510 and 520 includes 7 OFDM symbols in a normal CP case. Up to first three OFDM symbols (i.e., in case of 1.4 MHz bandwidth, up to 4 OFDM symbols) of the first slot 510 within the subframe 500 correspond to a control region 550 to which control channels are allocated, and the remaining OFDM symbols correspond to a data region 560 to which a physical downlink shared channel (PDSCH) is allocated.

A physical downlink control channel (PDCCH) may carry a downlink shared channel (DL-SCH)'s resource allocation and transmission format, uplink shared channel (UL-SCH)'s resource allocation information, paging information on a paging channel (PCH), system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs may be defined in the control region 550, and the UE may monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

The number of CCEs allocated to the PPDCH may vary depending on a format of downlink control information (DCI) to be sent by an eNB to the UE.

A unique identifier (a radio network temporary identifier (RNTI)) is masked to a cyclic redundancy check (CRC) of DCI transmitted through the PDCCH according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information-RNTI (SI-RNTI) may be masked to the CRC. To indicate a random access response that is a response for transmission of a random access preamble of the UE, a random access-RNTI (RA-RNTI) may be masked to the CRC.

Figure 6:
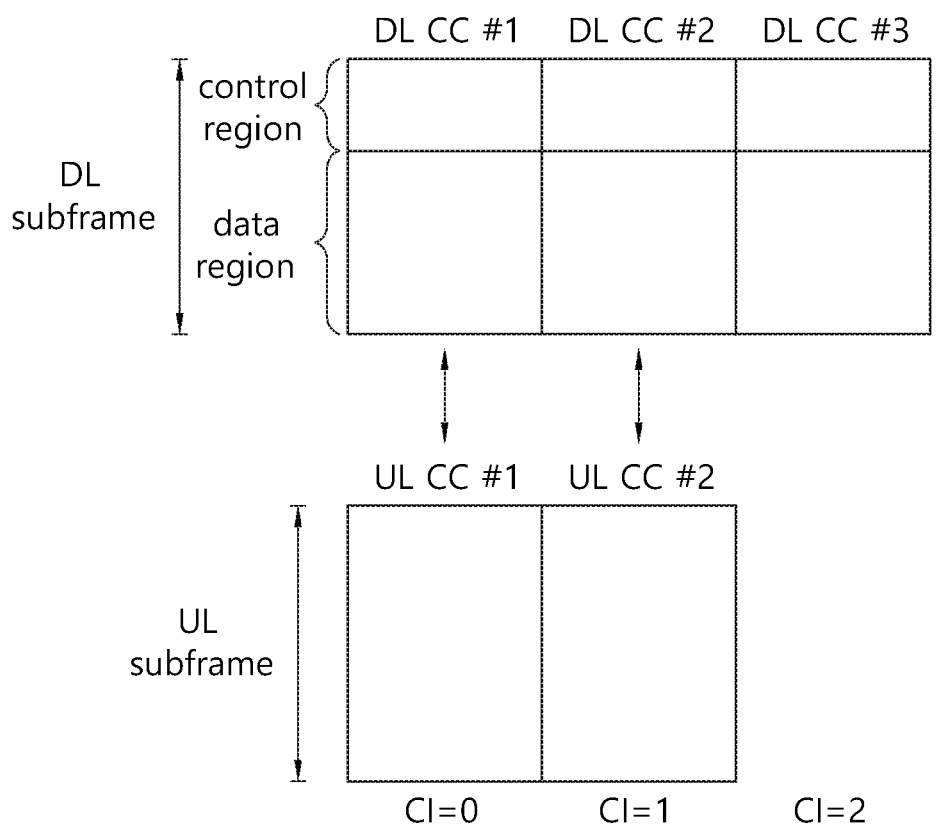
FIG. 6 is a concept view illustrating a carrier aggregation in an LTE system.

FIG. 6 is a concept view illustrating a carrier aggregation in an LTE system.

FIG. 6 illustrates multiple CCs. The multiple CCs may be, for example, an uplink frequency band and downlink frequency band of 60 MHz to which the uplink frequency band and downlink frequency band of 20 MHZ are aggregated.

An eNB may transmit downlink data to a UE through multiple downlink CCs on the basis of the carrier aggregation. The eNB may be able to perform downlink transmission by using N downlink CCs. If the UE can receive downlink data only through M downlink CCs (herein, M is a natural number less than or equal to N), the UE may receive only downlink data transmitted through the M downlink CCs from the eNB.

If the carrier aggregation is performed by using a CC of a primary cell (P-Cell) and a secondary cell (S-Cell), among carriers used in a downlink and an uplink, a carrier corresponding to the CC of the P-Cell is referred to as a primary cell component carrier (PCC) and a carrier corresponding to the S-Cell is referred to as a second cell component carrier (SCC).

An embodiment of the present invention discloses a method in which an LTE-A system used in the existing licensed band is allowed to be used in an unlicensed band.

When the LTE-A system is used in the unlicensed band, a delay or a loss may occur in packet transmission due to a collision between the LTE system and another communication system. Therefore, in order to improve a data transmission/reception rate in the LTE-A system operating in the unlicensed band, it is necessary to perform a carrier sensing scheme for avoiding the collision. However, since the LTE/LTE-A system is designed to be used in the licensed band, there is no self-mechanism for carrier sensing.

Hereinafter, in the embodiment of the present invention, for convenience of explanation, a base station and a terminal of the LTE system and LTE-A system may be expressed as an e-Node B (eNB) and a user equipment (UE), and a base station and a terminal of the WLAN system may be expressed as an AP and an STA.

Among communication systems that can be used in the unlicensed band, a communication system having a highest collision possibility with respect to the LTE-A system may be an IEEE 802.11-based WLAN system. A basic channel access scheme of the WLAN system is carrier sense medium access (CSMA)/collision avoidance (CA). The CSMA/CA may operate on the basis of carrier sensing. In the WLAN system, all STAs including the AP may perform the carrier sensing. A PPDU which is a physical layer frame of the WLAN system may include a PLCP preamble, a PLCP header, and a data field.

Figure 7:
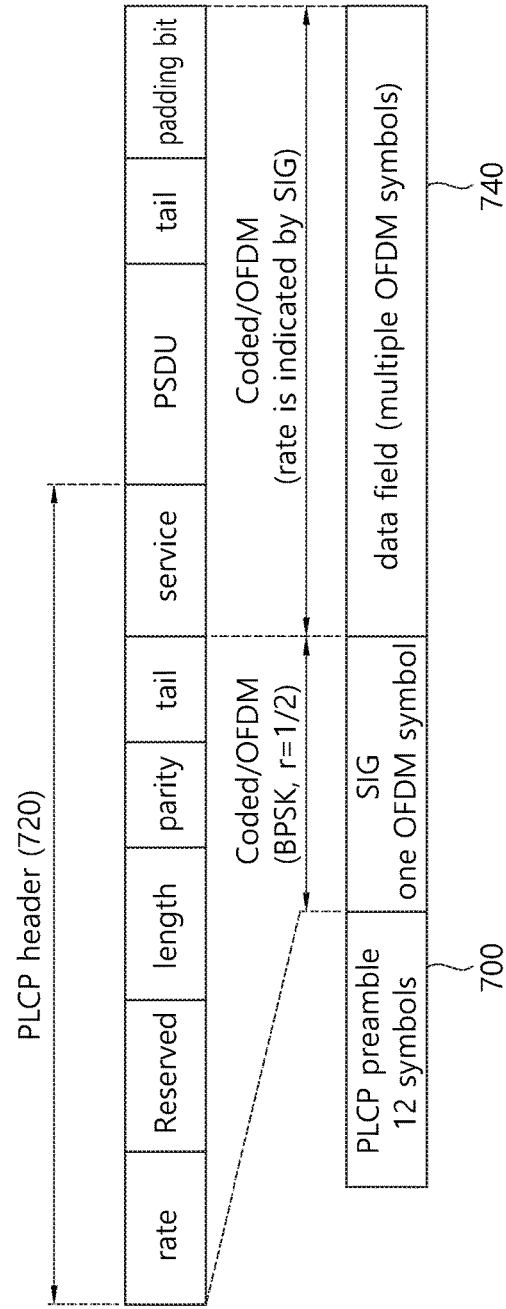
FIG. 7 is a concept view illustrating a PLCP protocol data unit (PPDU) format.

FIG. 7 is a concept view illustrating a PPDU format.

Referring to FIG. 7, the PPDU format may sequentially include a PLCP preamble 700, a PLCP header (or a signal (SIG) field) 720, and a data field 740.

The PLCP preamble 700 may include information for coarse frequency/time synchronization of an STA which has received a PPDU format frame. The SIG field corresponding to the PLCP header 720 transmitted at a later time may include information for a data rate and length of the data field 740 transmitted at a later time. In order for all STAs for receiving the PPDU format frame to correctly receive the SIG field, powerful coding may be applied to the SIG field.

Figure 8:
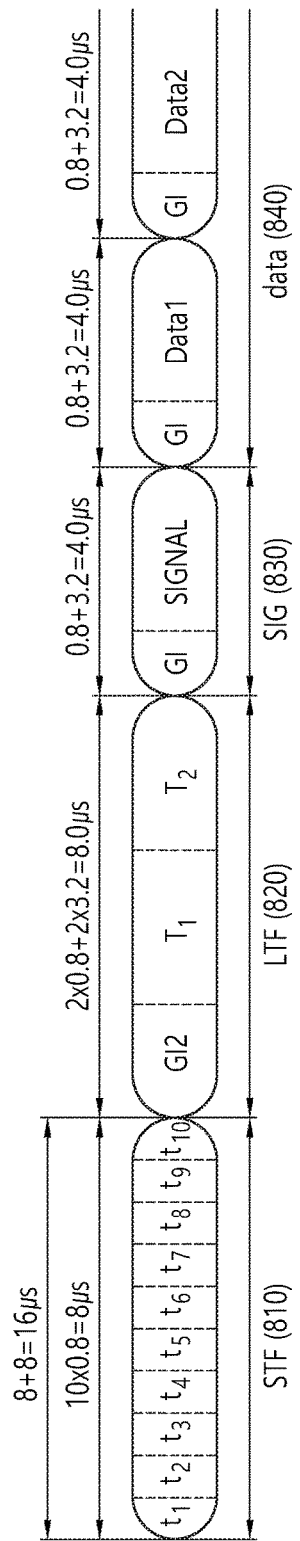
FIG. 8 is a concept view illustrating a physical layer convergence protocol (PLCP) preamble.

FIG. 8 is a concept view illustrating a PLCP preamble.

Referring to FIG. 8, the PLCP preamble may include 10 short training symbols (STFs) 810 and two long training symbols (or LTFs) 820.

Each of t1 to t10 indicates the STFs 810. T1 and T2 indicate the LTFs 820. Each of the STFs 810 has a length of 0.8 µs if a channel bandwidth is 20 MHz. The 10 STFs 810 may correspond to 8 µs on a time axis. Each of the LTFs 820 has a length of 3.2 µs, and may correspond to 8 µs on the time axis together with a guard interval (GI) (0.8 µs) corresponding to each training symbol.

That is, the STF 810 of 8 µs and the LTF 820 of 8 µs may constitute a PLCP preamble of 16 µs on the time axis. The STF 810 and the LTF 820 are designed for different purposes. The STF 810 may be used for frame detection, automatic gain control (AGC), diversity detection, and coarse frequency/time synchronization.

The LTF 820 may be used for fine frequency/time synchronization and channel estimation.

The SIG field 830 may be transmitted after the STF and the LTF.

Timing values of the respective fields disclosed in FIG. 8 are provided by assuming a channel bandwidth of 20 MHz. If the channel bandwidth is decreased to 10 MHz, the timing values may be increased by 2-fold, and if it is decreased to 5 MHz, the timing values may be increased by 4-fold.

In an unlicensed band, unlicensed equipments (or unlicensed terminals) competitively use a corresponding band. Therefore, an eNB and UE operating in the unlicensed band must be able to transmit and receive data by avoiding a collision and interference as much as possible, unlike in a guaranteed service in a licensed band. In the unlicensed band, a communication system which may cause the greatest interference and collision to the LTE/LTE-A system may be a WLAN system.

The legacy LTE/LTE-A system is designed for communication in the licensed band. Therefore, in the LTE/LTE-A system, there is no self-mechanism for carrier sensing.

Unlike this, in the WLAN system, an AP and an STA may access a channel on the basis of carrier sensing. Further, the PLCP preamble and the SIG field may be included in a head portion of all PPDUs transmitted and received between the AP and the STA. The SIG field may include information regarding information related to medium occupation (e.g., a PPDU length (or duration)). That is, if a specific STA has received the PPDU, information regarding medium occupation caused by communication between another STA and another AP may be acquired on the basis of the SIG field.

In a medium sharing method of a heterogeneous system according to the embodiment of the present invention, a basic downlink frame/uplink frame used in the LTE/LTE-A system may include the PLCP preamble and the SIG field. The PLCP preamble and SIG field included in the downlink/uplink frame may be used to avoid the collision as much as possible between a downlink frame/uplink frame transmitted by the eNB and UE of the LTE/LTE-A system in the unlicensed band and a PPDU transmitted by the AP and STA of the WLAN system.

Hereinafter, it is assumed for convenience of explanation in the embodiment of the present invention that the downlink frame/uplink frame have an information format used for data transmission in the LTE system, and the PPDU has an information format used for data transmission in the WLAN system. Further, an information unit including the PLCP preamble and the SIG preamble may be expressed as the term 'WLAN preamble'. The WLAN preamble may be implemented not only with a format of the legacy PLCP preamble and SIG field but also various data formats that can be received by the AP and STA operating in the WLAN system.

Figure 9:
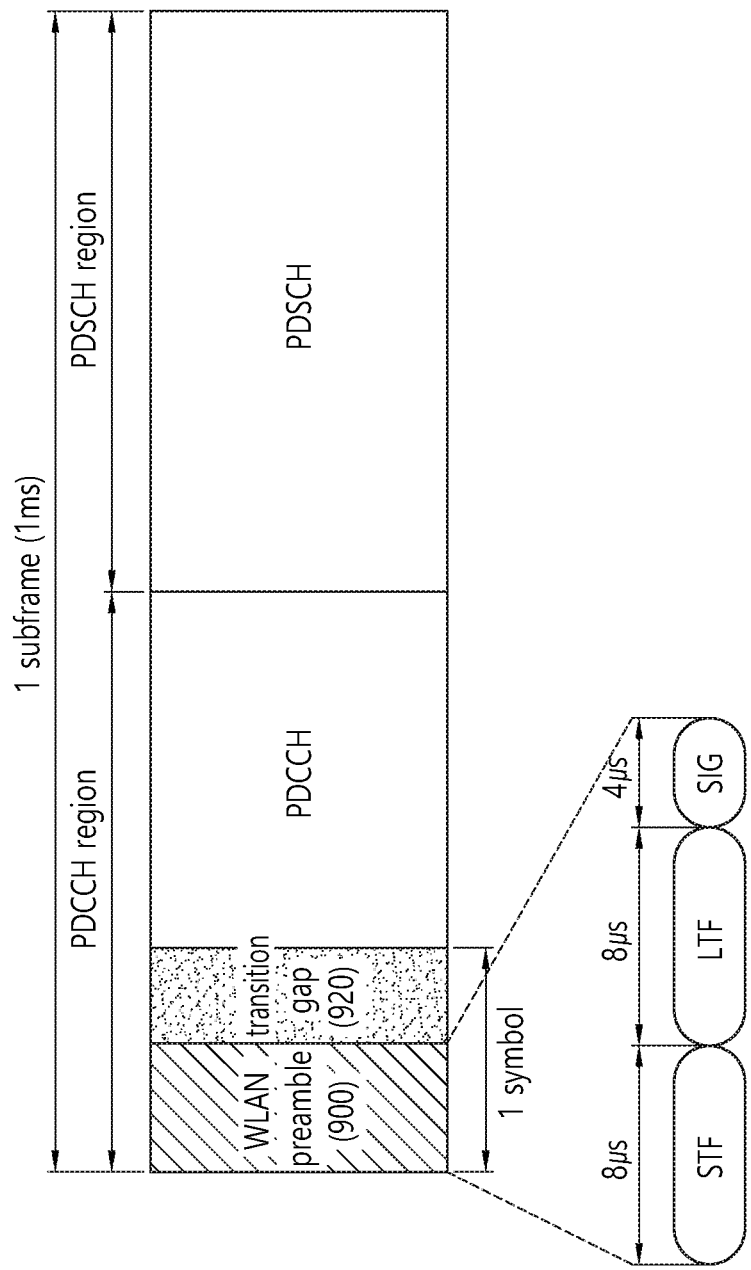
FIG. 9 is a concept view illustrating a downlink subframe format according to an embodiment of the present invention.

FIG. 9 is a concept view illustrating a downlink subframe format according to an embodiment of the present invention.

In FIG. 9, it is disclosed a format of a frequency division duplex (FDD) downlink subframe. As described above, an FDD downlink frame may include 10 downlink subframes. One subframe may have a length of 1 ms, and 10 subframes may be included in one frame. One subframe includes two slots, and one slot is 0.5 ms.

One slot may include up to 7 OFDM symbols according to a frame configuration parameter. If one slot includes 7 OFDM symbols, one subframe may include 14 OFDM symbols.

Further, in a first slot, a first OFDM symbol to up to a third OFDM symbol may be allocated for a PDCCH. The PDCCH is a channel for transmitting downlink/uplink scheduling information and extra control information to a UE. A resource region to which the PDCCH is allocated may be expressed as the term 'PDCCH region'.

In a method of transmitting data in an unlicensed band according to an embodiment of the present invention, a WLAN preamble 900 may be included in a PDCCH region of the existing downlink subframe.

If the channel bandwidth is 20 MHz as described above in FIG. 8, a length of a WLAN preamble may be 20 μs on a time axis. If it is assumed that 7 OFDM symbols constitute one slot in the LTE system, one OFDM symbol length of the LTE system may be 0.5 ms/7=71.42xx μs. That is, the WLAN preamble 900 corresponding to 20 MHz may be transmitted on one OFDM symbol of the LTE system. One OFDM symbol for transmitting the WLAN preamble 900 may include the remaining time resources of tens of μs except for a time resource corresponding to the WLAN preamble 900.

A frequency interval of a subcarrier for a PPDU may be different from a frequency interval of a subcarrier for a downlink subframe. Therefore, if the WLAN preamble 900 is inserted to the downlink subframe, for smooth processing, a transition gap 920 is required between a WLAN duration for transmitting the WLAN preamble 900 and an LTE duration for the PDCCH.

If the WLAN preamble 900 is transmitted on one OFDM symbol in the LTE system, the remaining time resources of tens of μs except for the time resource corresponding to the WLAN preamble 900 on one OFDM symbol may be used as the transition gap 920.

OFDM symbols starting from a next OFDM symbol of the OFDM symbol for the WLAN preamble 900 may be allocated for a channel for the LTE system. Hereinafter, in an embodiment of the present invention, in one subframe, an OFDM symbol for the WLAN preamble 900 may be expressed as the term 'WLAN OFDM symbol', and an OFDM symbol to which a channel for an operation of the LTE system is allocated may be expressed as the term 'LTE OFDM symbol'.

An eNB may transmit LTE-specific control data through a PDCCH on an LTE OFDM symbol other than the WLAN OFDM symbol in a subframe, and may transmit traffic data through a PDSCH. The eNB may perform signaling information regarding a position of the LTE OFDM symbol on the subframe (e.g., information regarding the LTE OFDM symbol to which the PDCCH is allocated) with respect to the UE. The UE may decode control data (PDCCH data) and traffic data (PDSCH data) transmitted on the LTE OFDM symbol on the basis of information signaled by the eNB.

The WLAN preamble (e.g., the SIG field) 900 transmitted on a downlink subframe may include information regarding medium occupation between the eNB and the UE. For example, the WLAN preamble 900 may include information regarding a time resource occupied for communication between the eNB and the UE.

In an unlicensed band, the WLAN preamble 900 may be transmitted on the downlink subframe. The AP and/or STA of the WLAN system operating in the unlicensed band may receive the WLAN preamble 900 on the downlink subframe. The AP and/or the STA may acquire information regarding medium occupation between the eNB and UE operating in the LTE/LTE-A system on the basis of the WLAN preamble 900 transmitted on the downlink subframe.

Specifically, the AP and/or the STA may acquire the information regarding the medium occupation between the eNB and UE operating in the LTE/LTE-A system on the basis of the WLAN preamble 900 transmitted on the downlink subframe. For example, a length field which is a sub-field of the SIG field included in the WLAN preamble 900 may include information regarding a medium occupation time between the eNB and the UE. The UE and eNB of the LTE/LTE-A system may report medium occupation for a designated time duration to another UE (another UE or another eNB of the LTE/LTE-A system and/or another STA and another AP of the WLAN system) on the basis of the information included in the length field of the SIG field.

In other words, the eNB of the LTE/LTE-A system may acquire a transmission opportunity (TXOP) for medium occupation for an indicated time duration on the basis of a length field. The AP and/or STA of the WLWN system may predict a state of the medium as a busy state and thus may not transmit a signal for a duration corresponding to a determined TXOP. Therefore, the eNB of the LTE/LTE-A system can increase a probability for communicating with the UE without a collision with the WLAN system.

In the unlicensed band, the WLAN system may use a 20 MHz channel bandwidth as a basic unit, and may support a size of a channel bandwidth corresponding to 40 MHz/80 MH/160 MHz. If the LTE/LTE-A system desires to use a channel bandwidth exceeding 20 MHz in the unlicensed band, a WLAN preamble (a PLCP preamble and an SIG field) may be generated in a duplicated format. The duplicated WLAN preamble may be transmitted through an LTE frame on the channel band exceeding the 20 MHz channel band. The duplicated format may have a format in which a frame format transmitted on the 20 MHz channel is duplicated.

Figure 10:
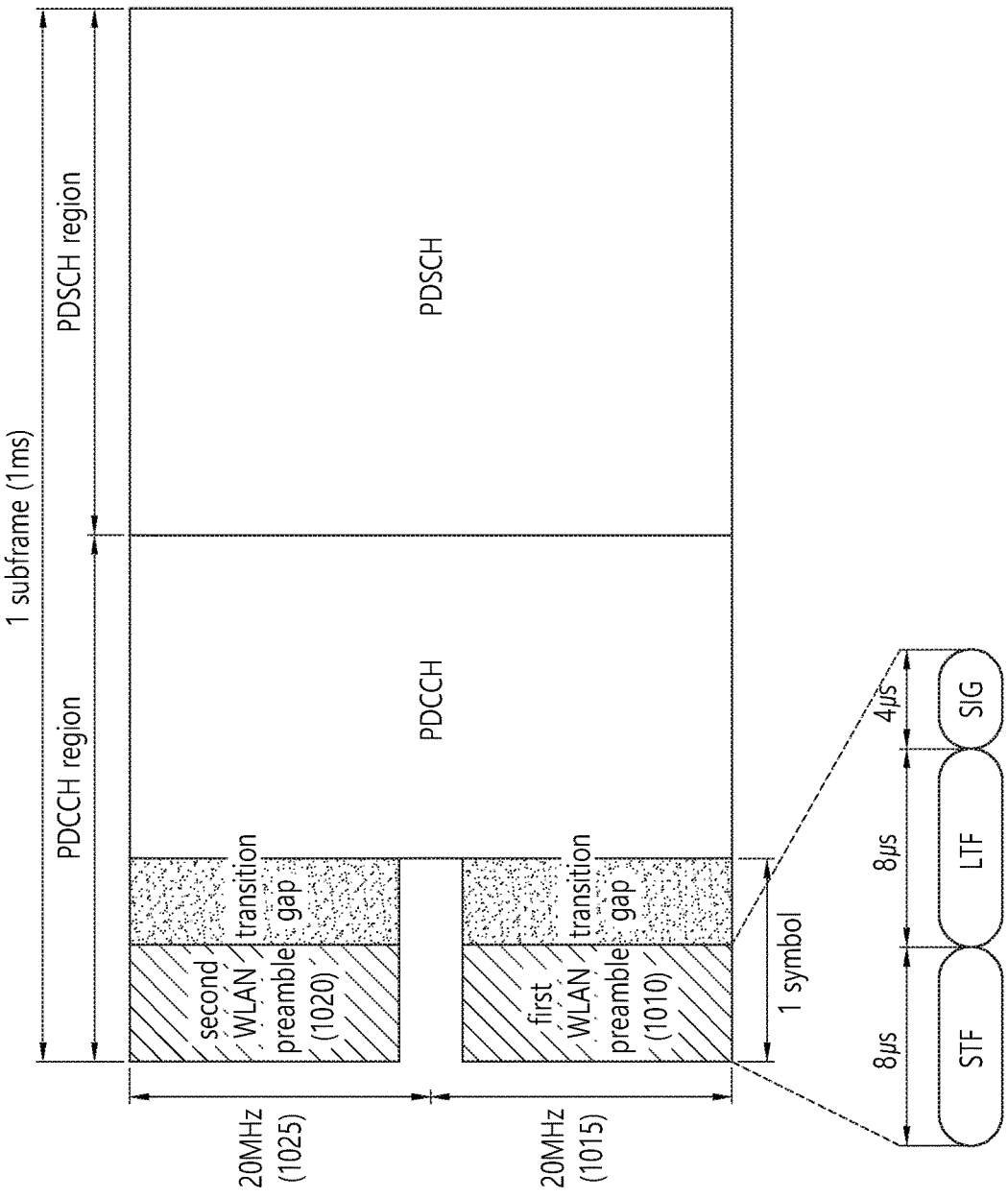
FIG. 10 is a concept view illustrating a downlink subframe according to an embodiment of the present invention.

FIG. 10 is a concept view illustrating a downlink subframe according to an embodiment of the present invention.

In FIG. 10, it is disclosed a downlink subframe in which a WLAN preamble of a duplicated format is transmitted at a bandwidth exceeding 20 MHz.

Referring to FIG. 10, if an eNB of an LTE/LTE-A system desires to perform communication with a UE through a channel bandwidth exceeding 20 MHz and less than or equal to 40 MHz in an unlicensed band, a duplicated WLAN preamble may be transmitted on a downlink subframe. The duplicated WLAN preamble is a field in which the WLAN preamble transmitted through 20 MHz is duplicated according to an extension of a channel bandwidth.

Assuming a case where downlink data is transmitted through a 40 MHz channel bandwidth, a first WLAN preamble 1010 may be transmitted through a 20 MHz channel bandwidth 1015 in total of a 40 MHz channel bandwidth. A second WLAN preamble 1020 having a duplicated format of the first WLAN preamble 1010 may be transmitted through a remaining 20 MHz channel bandwidth 1025.

That is, if the eNB of the LTE/LTE-A system desires to use a channel bandwidth exceeding 40 MHz and less than or equal to 80 MHz in the unlicensed band, the WLAN preamble may be transmitted through the full channel bandwidth for transmission of downlink data by overlapping (or being duplicated) in unit of the 20 MH channel bandwidth. That is, the first WLAN preamble may be transmitted through the 20 MHz channel bandwidth in total of an 80 MHz channel bandwidth, and the duplicated WLAN preamble may be transmitted through each of 20 MHz channel bandwidths included in a remaining 60 MHz channel bandwidth.

If the WLAN preamble is transmitted by being duplicated in unit of the 20 MHz channel bandwidth and if data transmitted through the WLAN preamble is identical, a peak to average power ratio (PAPR) of a transmitting terminal may be increased.

In order to decrease the PAPR, a phase rotation of {1, j} may be applied to the WLAN preamble transmitted in unit of the 20 MHz channel bandwidth.

Specifically, in FIG. 10, the phase rotation of {1, j} may be applied to the first WLAN preamble 1010 transmitted through the first 20 MHz channel bandwidth 1015 and the second WLAN preamble 1020 transmitted through the second 20 MHz channel bandwidth 1025.

If downlink data is transmitted through a channel bandwidth exceeding 40 MHz and less than or equal to 80 MHz in the unlicensed band in the LTE/LTE-A system, the WLAN preamble may be transmitted in a duplicated format in unit of the 20 MHz channel bandwidth. If the WLAN preamble is transmitted through the 80 MHz channel bandwidth, a phase rotation of {1, −1. −1, −1} may be applied to the WLAN preamble transmitted in unit of the 20 MHz channel bandwidth.

The WLAN system is an off-loading control-type system unlike a central control-type cellular system such as the LTE/LTE-A system. In the cellular system, the eNB may schedule both of downlink transmission and uplink transmission.

In addition, uplink scaling information and downlink scaling information may be transmitted through a PDCCH. Of course, there is a case where the UE autonomously transmits a signal as in random access. However, a resource for the random access of the UE may also be scheduled by the eNB. Therefore, a length value of a length field included in an SIG field transmitted on a downlink subframe in the LTE/LTE-A system may indicate a time resource for receiving uplink data by the eNB from the UE after downlink data is transmitted.

For example, the length value may include information regarding a time resource in the range of a time resource corresponding to a downlink frame for current downlink transmission to a time resource corresponding to a downlink frame for next downlink transmission. After the downlink frame is transmitted by the eNB through the determined length value, a time resource can be ensured until an uplink frame is transmitted by the UE. When uplink data is transmitted after the UE receives downlink data through the determination of the length value of the SIG field, additional carrier sensing may not be performed. The UE may transmit the uplink data in a TXOP duration determined on the basis of the length value.

Figure 11:
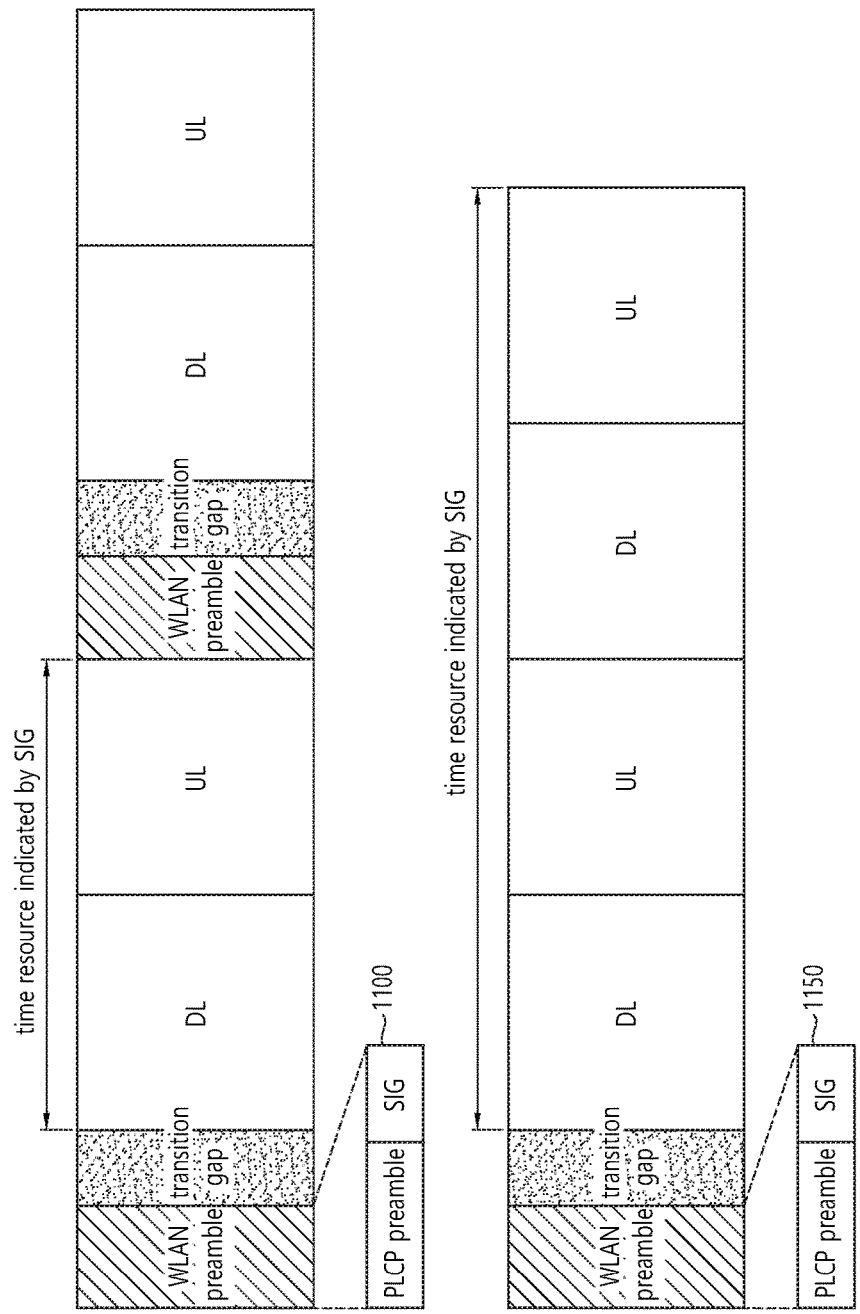
FIG. 11 is a concept view illustrating determining of a length value of a signal (SIG) field according to an embodiment of the present invention.

FIG. 11 is a concept view illustrating determining of a length value of an SIG field according to an embodiment of the present invention.

In FIG. 11, the determining of the length value of the SIG field is disclosed by assuming a case where a frame structure of an LTE/LTE-A system is a simple repetition of a downlink subframe and an uplink subframe (e.g., {DL, UL, DL, UL, DL, UL, DL, UL, DL, UL}) in an unlicensed band.

Referring to the upper part of FIG. 11, assuming a case where a WLAN preamble is transmitted only through a downlink frame, a value corresponding to a length field included in an SIG field 110 of the WLAN preamble may indicate a time resource in the range of a time resource corresponding to a current downlink subframe to a time resource for a previous uplink frame of a next downlink subframe. In other words, the value of the length field may include information regarding a duration of a downlink frame currently transmitted and up to an uplink subframe subsequent to the currently transmitted downlink frame. That is, a time resource for downlink transmission and uplink transmission may be occupied on the basis of a WLAN preamble on a downlink subframe transmitted by the eNB.

When a frame of an LTE system is configured in a simple repetition of a downlink subframe and an uplink subframe, the length value of the length field included in the SIG field 1100 may be configured as a value obtained by subtracting a length of a time resource corresponding to the WLAN preamble from 2 ms as a time resource corresponding to two subframes.

Referring to the lower part of FIG. 11, a length field included in an SIG field 1150 may be configured for a transmission duration of a plurality of downlink subframes and a transmission duration of a plurality of uplink subframes. For example, the SIG field 1150 included in a first downlink subframe may indicate a time resource for transmission and reception of the first downlink subframe, a second uplink subframe, a third downlink subframe, and a fourth uplink subframe. In this case, a value obtained by subtracting the length of the time resource corresponding to the WLAN preamble from 4 ms as a time resource corresponding to four subframes may be determined as the length value of the SIG field 1150.

When the WLAN preamble is transmitted on a downlink subframe of the LTE/LTE-A system, it may cause a change in a frame format of the legacy LTE/LTE-A system. A UE operating in the legacy LTE/LTE-A system decodes data transmitted through a PDCCH on a first OFDM symbol of a downlink subframe. If the WLAN preamble is allocated on the first OFDM symbol of the downlink subframe, the UE cannot acquire control information through a PDCCH on the first ODM symbol. When the WLAN preamble is allocated on the first OFDM symbol, it is assumed a case where a channel bandwidth is 20 MHz. The number of OFDM symbols allocated for the WLAN preamble on the downlink subframe may vary according to a size of a channel bandwidth.

In order for the UE to receive the control information through the PDCCH from the eNB, the eNB may have to perform signaling on information regarding a start point of the PDCCH to the UE. Alternatively, the start point of the PDCCH may be implicitly agreed between the UE and the eNB. The WLAN preamble may be allocated to a time resource which has a different size according to the size of the channel bandwidth. That is, the start time of the PDCCH may be determined according to the size of the channel bandwidth used for communication between the eNB and the UE.

The UE may acquire information regarding the OFDM symbol to which the PDCCH is allocated on the downlink subframe on the basis of information regarding the channel bandwidth for transmission of the downlink subframe. Specifically, if the channel bandwidth allocated for transmission of the downlink subframe is 20 MHz, a length of the WLAN preamble included in the downlink subframe may be 16 μs+4 μs=20 μs. Since the WLAN preamble is transmitted on one OFDM symbol of the downlink subframe, the remaining time resources other than 20 μs in one OFDM symbol for transmitting the WLAN preamble may be utilized as a transition gap for the eNB. In this case, the PDCCH may be transmitted on a second OFDM symbol of the downlink subframe. The UE may know that the PDCCH is transmitted on the second OFDM symbol of the subframe on the basis of channel bandwidth information (20 MHz) for the downlink subframe. The UE may decode data transmitted through the PDCCH on the second OFDM symbol of the subframe.

For another example, if the channel bandwidth for the downlink subframe is 10 MHz, the length of the WLAN preamble included in the downlink subframe may be 40 μs. If the WLAN preamble is transmitted on a time resource of 40 μs, the WLAN preamble may be transmitted on one OFDM symbol of the downlink subframe. The remaining time resources other than the 40 μs time resource for the WLAN preamble on one OFDM symbol may be utilized as a transition gap for the eNB. In this case, a PDCCH may be transmitted on a second OFDM symbol of the downlink subframe. The UE may know that the PDCCH is transmitted on the second OFDM symbol of the subframe on the basis of channel bandwidth information (10 MHz) for the downlink subframe. The UE may decode data transmitted through the PDCCH on the second OFDM symbol of the subframe.

For another example, if the channel bandwidth for the downlink subframe is 5 MHz, a time resource for the WLAN preamble included in the downlink frame may be 80 μs. If the WLAN preamble is allocated on the time resource of 80 μs, the WLAN preamble may be transmitted on two OFDM symbols. A time resource other than the time resource allocated for the WLAN preamble in a second OFDM symbol may be utilized as a transition gap of the eNB. In this case, a PDCCH may be transmitted on a third OFDM symbol of the downlink subframe. The UE may know that the PDCCH is transmitted on the third OFDM symbol of the subframe on the basis of channel bandwidth information (5 MHz) for the downlink subframe. The UE may decode data transmitted through the PDCCH on the third OFDM symbol of the subframe.

If the LTE/LTE-A system is used in the unlicensed band, the OFDM symbol for transmission of the PDCCH in the downlink subframe may be determined according to a size of a channel bandwidth. The length of the transition gap may also be determined according to the size of the channel bandwidth.

If no signal is transmitted in a time duration corresponding to the transition gap, another STA may determine a state of a medium as an idle state and thus may attempt to transmit data in the duration corresponding to the transition gap. Therefore, the transition gap may be allocated as a possible shortest duration in practice or null data may be transmitted to indicate that the medium is not idle through the transition gap.

If the LTE/LTE-A system as a synchronized system is used in the unlicensed band, there is a high possibility that time division duplex (TDD) is primarily used rather than frequency division duplex (FDD). If the LTE system operates using TDD in the unlicensed band, the eNB must perform signaling information (e.g., subframe configuration information) regarding configuration of a downlink subframe and an uplink subframe in a frame to the UE.

An amount of traffic transmitted through an uplink and an amount of traffic transmitted through a downlink are not symmetric in general. In general, the number of downlink subframes may be greater than the number of uplink subframes constituting one frame.

Given that an uplink frequency resource and a downlink frequency resource coexist when using TDD and carrier sensing may be necessary before transmitting a WLAN preamble prior to a start of every frame, usefulness of subframe configuration information used in the existing licensed band may be vanished. In the LTE system operating in the unlicensed band according to the embodiment of the present invention, the subframe configuration information may be transmitted in various manners.

For example, the subframe configuration information may be transmitted on each PDCCH of a downlink subframe, or may be transmitted through a PDCCH of a downlink subframe which is first located temporally in a frame.

Figure 12:
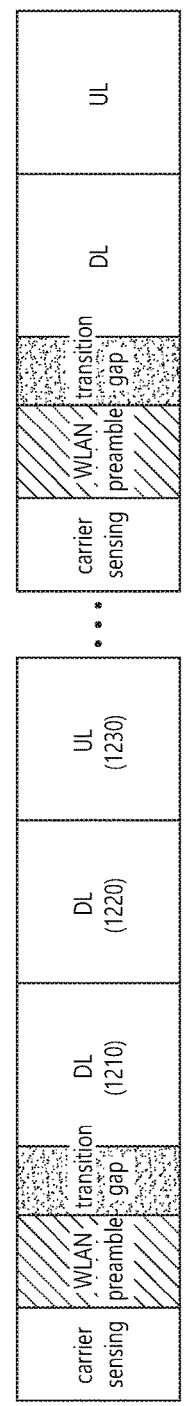
FIG. 12 is a concept view illustrating a subframe configuration of an LTE system operating using time division duplex (TDD) according to an embodiment of the present invention.

FIG. 12 is a concept view illustrating a subframe configuration of an LTE system operating using TDD according to an embodiment of the present invention.

In case of using TDD in a duplex manner, one frame may consist of a plurality of downlink subframes and a plurality of uplink subframes. A WLAN preamble may be transmitted on a downlink subframe 1210 which is first included temporally in the frame. If carrier sensing is possible, the eNB may determine whether a channel state of a medium is busy by performing the carrier sensing for transmitting the downlink subframe. If carrier sensing is possible, the eNB may determine whether the channel state of the medium is busy by performing the carrier sensing for transmitting the downlink subframe. If the eNB determines that the state of the medium is idle on the basis of the carrier sensing, the eNB may transmit the WLAN preamble on the frame.

The subframe configuration information may be transmitted to the UE for every PDCCH on each downlink subframe. Alternatively, if downlink subframe 1210 and 1220 exist consecutively, it may be transmitted to the UE through a PDCCH on the specific downlink subframe 1210 (a downlink subframe which is first located temporally on the frame) between the consecutive downlink subframe 1210 and 1220. Alternatively, the subframe configuration information for subframes prior to the next downlink subframe 1220 may be transmitted to the UE on the PDCCH of the specific downlink subframe 1210.

The uplink control information signaled through the PDCCH on the downlink subframe 1210 and information regarding uplink scheduling may be information regarding uplink control and uplink scheduling for a subframe corresponding to the uplink subframe 1230 among up to N (e.g., 5) consecutive subframes 1210, 1220, 1230, . . . , including the downlink subframe 1210.

If the eNB which has accessed one time as described above intends to transmit a downlink subframe in a consecutive manner, the eNB may restrict channel access of other terminals by ensuring a TXOP for a specific duration on the basis of a length value of a length field included in an SIG field.

According to an embodiment of the present invention, without having to change a structure of a subframe/frame used in the legacy LTE/LTE-A system, a WLAN preamble can be transmitted through an additional resource located in a head portion of the legacy LTE subframe structure. In this case, signaling for a start point of a PDCCH may be unnecessary on a subframe.

Figure 13:
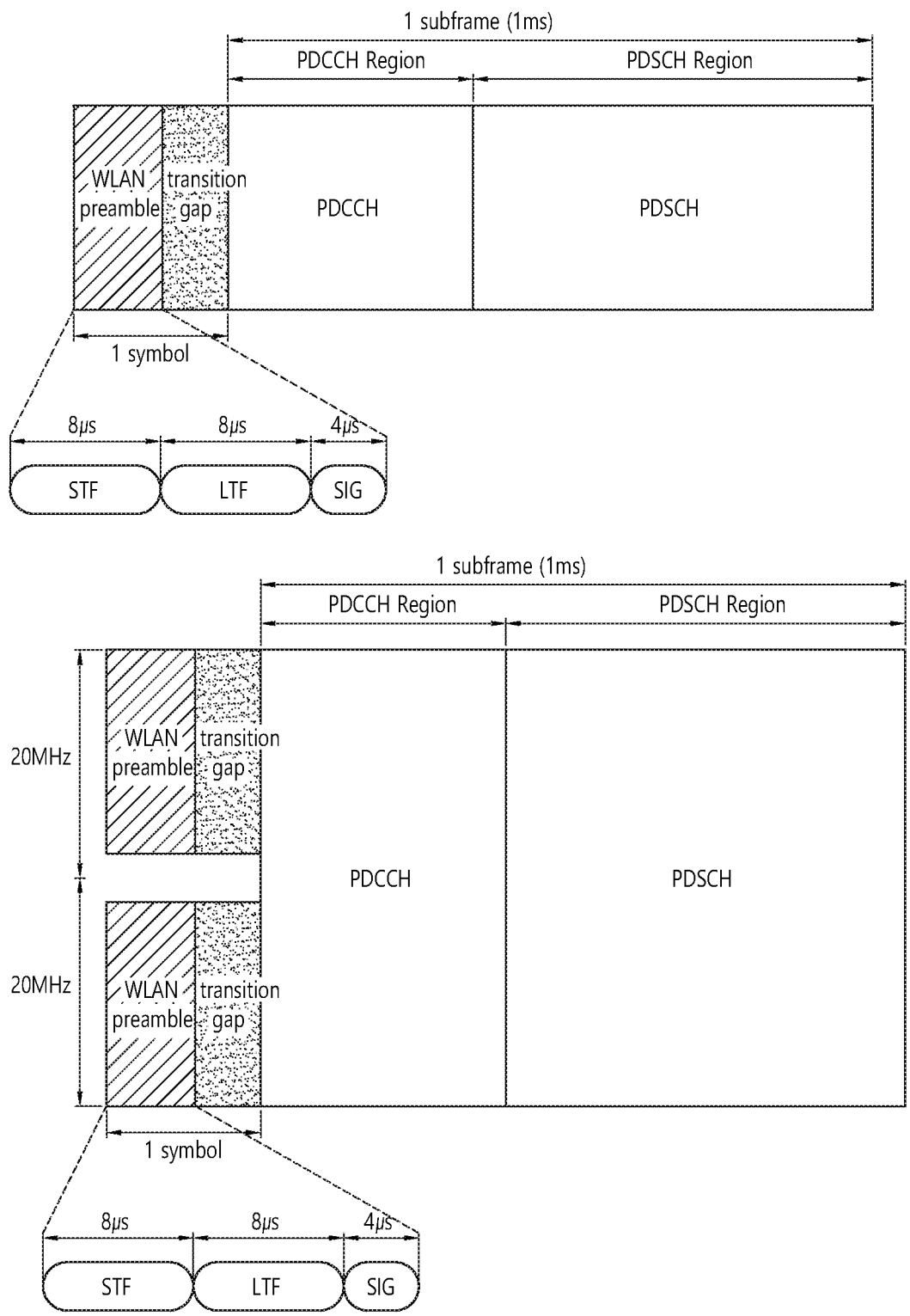
FIG. 13 is a concept view illustrating a downlink subframe according to an embodiment of the present invention.

FIG. 13 is a concept view illustrating a downlink subframe according to an embodiment of the present invention.

In the upper part of the FIG. 13, it is disclosed a downlink subframe transmitted through a 20 MHz channel bandwidth in an LTE/LTE-A system operating in an unlicensed band.

Referring to the upper part of FIG. 13, an additional resource may be allocated for a WLAN preamble before downlink data is transmitted through the downlink subframe. Since the WLAN preamble is not transmitted through a resource allocated for a PDCCH, the existing downlink subframe structure may be directly used. Specifically, the WLAN preamble may be allocated on an additional OFDM symbol other than an OFDM symbol for the downlink subframe. The additional OFDM symbol for the WLAN preamble may be expressed as the term 'WLAN OFDM symbol'.

In case of using a normal CP in the downlink subframe, after the WLAN OFDM symbol, downlink data for the UE may be transmitted on 14 OFDM symbols (7 OFDM symbols per slot).

In case of using an extended CP in the downlink subframe, after the WLAN OFDM symbol, downlink data for the UE may be transmitted on 12 OFDM symbols (6 OFDM symbols per slot). The UE may receive the downlink data from an eNB in the absence of signaling for a start point of a PDCCH. The UE may receive only downlink data transmitted on the OFDM symbol for the downlink subframe, while ignoring a WLAN preamble transmitted on a WLAN OFDM symbol. In the lower part of FIG. 13, it is disclosed a downlink subframe transmitted through a 40 MHz channel bandwidth in an LTE/LTE-A system operating in an unlicensed band.

Referring to the lower part of FIG. 13, an additional resource may be allocated for a WLAN preamble before downlink data is transmitted through the downlink subframe. Specifically, the WLAN preamble may be allocated on an additional OFDM symbol other than an OFDM symbol for the downlink subframe. A WLAN preamble transmitted through a channel bandwidth of a remaining 20 MHz other than a primary channel of 20 MHz in total of 40 MHz may be a duplicated WLAN preamble.

When downlink data is transmitted through the 40 MHz channel band, the WLAN preamble may be allocated on an additional OFDM symbol other than an OFDM symbol for the downlink subframe. In case of using a normal CP in the downlink subframe, after the WLAN OFDM symbol, downlink data for the UE may be transmitted on 14 OFDM symbols (7 OFDM symbols per slot). In case of using an extended CP in the downlink subframe, after the WLAN OFDM symbol, downlink data for the UE may be transmitted on 12 OFDM symbols (6 OFDM symbols per slot).

Figure 14:
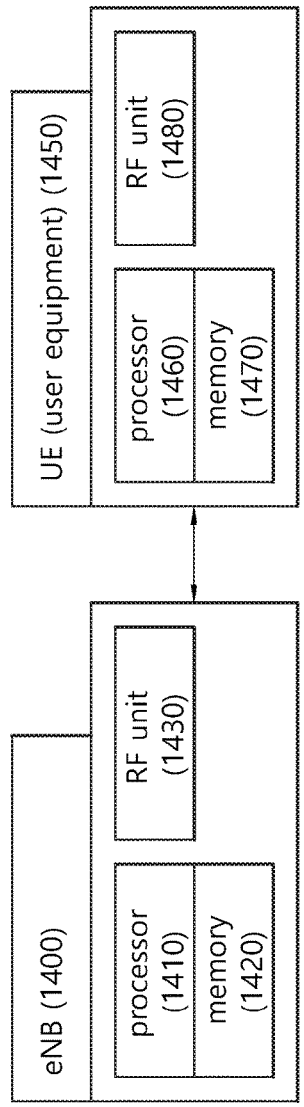
FIG. 14 is a block diagram illustrating a wireless communication system according to an embodiment of the present invention.

FIG. 14 is a block diagram illustrating a wireless communication system according to an embodiment of the present invention.

An eNB 1400 includes a processor 1410, a memory 1420, and a radio frequency (RF) unit 1430. The memory 1420 is coupled to the processor 1410, and stores a variety of information for driving the processor 1410. The RF unit 1430 is coupled to the processor 1410, and transmits and/or receives a radio signal. The processor 1410 implements the proposed functions, procedures, and/or methods. In the aforementioned embodiment, an operation of the eNB may be implemented by the processor 1410.

For example, the processor 1410 may be configured to generate downlink data and to transmit the downlink data to a terminal through a downlink subframe. The downlink data may include a WLAN preamble, physical downlink control channel (PDCCH) data, and physical downlink shared channel (PDSCH) data. The WLAN preamble may include information on time resources for communication between the eNB and the terminal. The PDCCH data may include control data for the terminal. The PDSCH data may include traffic data for the terminal.

A wireless device 1450 includes a processor 1460, a memory 1470, and an RF unit 1480. The wireless device 1450 may also be referred to as another term such as a terminal or a UE. The memory 1470 is coupled to the processor 1460, and stores a variety of information for driving the processor 1460. The RF unit 1480 is coupled to the processor 1460, and transmits and/or receives a radio signal. The processor 1460 implements the proposed functions, procedures, and/or methods. In the aforementioned embodiment, an operation of the wireless device may be implemented by the processor 1460.

For example, the processor 1460 may be configured to receive information regarding a position of an OFDM symbol for PDCCH data other than an OFDM symbol for a WLAN preamble on a downlink subframe from the eNB, and to decode a PDCCH.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of transmitting downlink (DL) data in an unlicensed band, the method performed by a base station (BS) and comprising:
   generating DL data;
   transmitting the generated DL data to a terminal through a DL subframe,
   wherein the DL data comprises a wireless local area network (WLAN) preamble, physical DL control channel (PDCCH) data, and physical DL shared channel (PDSCH) data,
   wherein the WLAN preamble comprises information related to resources for communication between the BS and the terminal,
   wherein the PDCCH data comprises control data for the terminal,
   wherein the PDSCH data comprises traffic data for the terminal,
   wherein the WLAN preamble is transmitted via at least one orthogonal frequency division multiplexing (OFDM) symbol located first temporally in the DL subframe; and
   transmitting information to the terminal according to the at least one OFDM symbol, the information related to a position of an OFDM symbol for the PDCCH data in the DL subframe.

2. The method of claim 1, wherein:
   the WLAN preamble is transmitted via one OFDM symbol if the downlink data is transmitted via a 10 MHz channel band or a 20 MHz channel band; and
   the WLAN preamble is transmitted via two OFDM symbols if the downlink data is transmitted via a 5 MHz channel band.

3. The method of claim 1, wherein:
   the WLAN preamble comprises a first WLAN preamble transmitted via a 20 MHz channel band of a total 40 MHz channel band and a second WLAN preamble transmitted via a remaining 20 MHz channel band of the total 40 MHz channel band; and
   the second WLAN preamble has a same format as the first WLAN preamble.

4. The method of claim 3, wherein the first WLAN preamble and the second WLAN preamble have different phases.

5. The method of claim 1, wherein:
   a time resource comprises a time resource in a range of a time resource for the DL subframe to a time resource for uplink (UL) subframes subsequent to the DL subframe; and
   the UL subframe is located before a next DL subframe.

6. A base station (BS) for transmitting downlink (DL) data in an unlicensed band, the BS comprising:
   a radio frequency (RF) unit configured to transmit or receive a radio signal; and
   a processor selectively coupled to the RF unit and configured to:
   generate DL data; and
   control the RF unit to transmit the generated DL data to a terminal through a DL subframe,
   wherein the DL data comprises a wireless local area network (WLAN) preamble, physical DL control channel (PDCCH) data, and physical DL shared channel (PDSCH) data,
   wherein the WLAN preamble comprises information related to resources for communication between the BS and the terminal,
   wherein the PDCCH data comprises control data for the terminal,
   wherein the PDSCH data comprises traffic data for the terminal,
   wherein the WLAN preamble is transmitted via at least one orthogonal frequency division multiplexing (OFDM) symbol located first temporally in the DL subframe; and
   control the RF unit to transmit information to the terminal according to the at least one OFDM symbol, the information related to a position of an OFDM symbol for the PDCCH data in the DL subframe.

7. The base station of claim 6, wherein:
   the WLAN preamble is transmitted via one OFDM symbol if the downlink data is transmitted via a 10 MHz channel band or a 20 MHz channel band; and
   the WLAN preamble is transmitted via two OFDM symbols if the downlink data is transmitted via a 5 MHz channel band.

8. The base station of claim 6, wherein:
   the WLAN preamble comprises a first WLAN preamble transmitted via a 20 MHz channel band of a total 40 MHz channel band and a second WLAN preamble transmitted via a remaining 20 MHz channel band of the total 40 MHz channel band; and
   the second WLAN preamble has a same format as the first WLAN preamble.

9. The base station of claim 8, wherein the first WLAN preamble and the second WLAN preamble have different phases.

10. The base station of claim 6, wherein:
    a time resource comprises a time resource in a range of a time resource for the DL subframe to a time resource for uplink (UL) subframes subsequent to the DL subframe; and
    the UL subframe is located before a next DL subframe.

* * * * *